(12) United States Patent
Suzuki et al.

(10) Patent No.: US 6,340,265 B1
(45) Date of Patent: Jan. 22, 2002

(54) CABLE END FASTENING DEVICE FOR A VEHICULAR REMOTE CONTROL CABLE

(75) Inventors: Kenichi Suzuki; Toyokazu Tsuge; Kazutaka Awata, all of Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/468,880

(22) Filed: Dec. 22, 1999

(30) Foreign Application Priority Data

Dec. 22, 1998 (JP) ............................................ 10-365163
Dec. 16, 1999 (JP) ............................................ 11-357460

(51) Int. Cl.⁷ ................................................. F16C 1/12
(52) U.S. Cl. ..................... 403/316; 403/299; 74/502.4
(58) Field of Search ................................. 403/316, 299, 403/74; 411/299, 296, 297, 298, 941, 941.1, 941.2, 941.3; 74/502.4

(56) References Cited

U.S. PATENT DOCUMENTS

| | | | |
|---|---|---|---|
| 4,050,327 A | * | 9/1977 | Thomas et al. ........ 74/502.4 X |
| 4,339,213 A | | 7/1982 | Gilmore |
| 5,347,882 A | * | 9/1994 | Klotz .................... 74/502.4 X |
| 6,105,458 A | * | 8/2000 | Casas Gomila et al. ... 74/502.4 |

FOREIGN PATENT DOCUMENTS

| | | |
|---|---|---|
| EP | 0703395 A1 | 3/1996 |
| FR | 2723989 | 3/1996 |
| GB | 320 495 | 10/1929 |
| GB | 2 143 610 A | 2/1985 |
| GB | 2 230 323 A | 10/1990 |

* cited by examiner

Primary Examiner—Lynne H. Browne
Assistant Examiner—John R. Cottingham
(74) Attorney, Agent, or Firm—Morgan, Lewis & Bockius LLP

(57) ABSTRACT tubular socket (3) is placed. The socket (3) has a male thread portion (3b), through an inner space of which an inner cable (4) passes. A nut (6) is tightened on the male thread portion (3b) to exert against an outer peripheral area (10b) of the notched opening (10). A torsion coil spring (7) urges the nut (6) in such a direction as to always tighten the nut (6) in order to prevent the nut (6) from becoming inadvertently loosened.

9 Claims, 13 Drawing Sheets

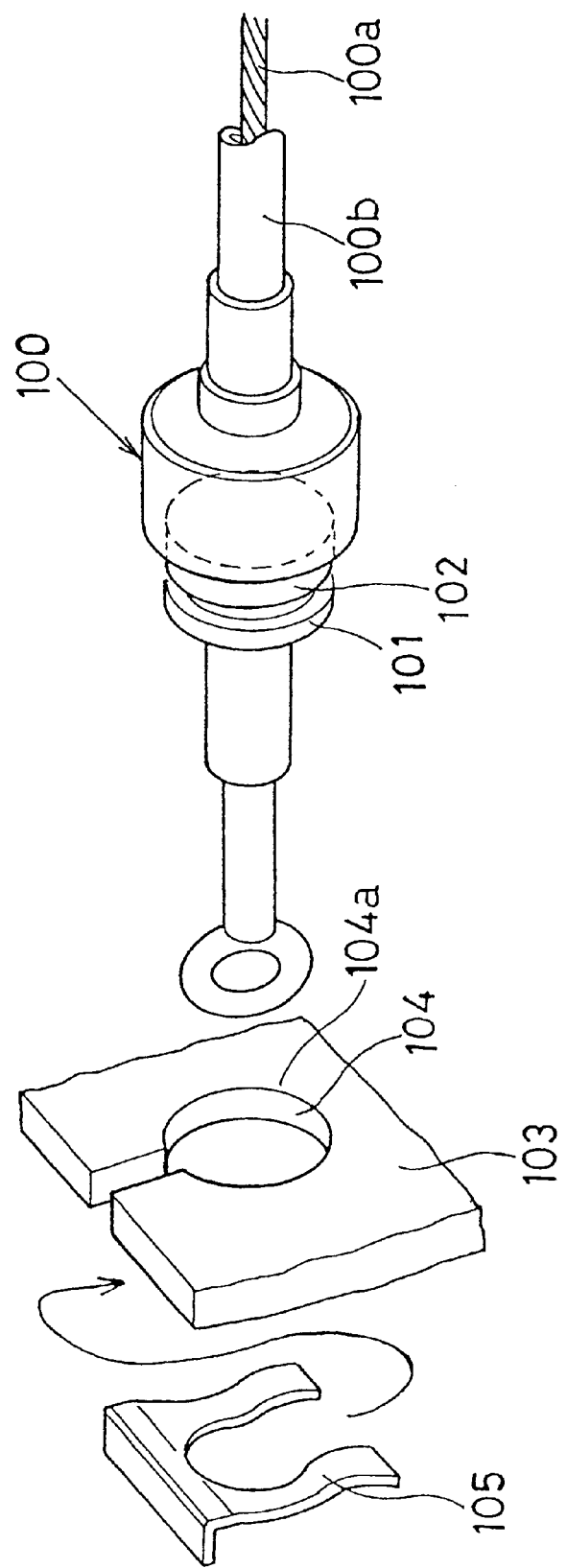

CABLE END FASTENING DEVICE FOR A VEHICULAR REMOTE CONTROL CABLE

BACKGROUND OF THE INVENTION

1. Field of the Invention

The invention relates to a cable end fastening device in which a fastening structure is improved to quickly secure a vehicular remote control cable to a bracket.

2. Description of Prior Art

This type of cable end fastening device has been introduced as shown in FIG. 13. This device has a columnar socket 100 in which an inner cable 100a passes through a sleeve 100b. The socket 100 has a left end which has flange portions 101, 102. The flange portions 101, 102 are brought into a notched opening 104 in a fashion to sandwich an outer peripheral edge 104a of the notched opening 104 when fastening the socket 100 to a bracket plate 103. With the use of a hammer (not shown), a wavy washer 105 is driven into between the flange portion 101 and the outer peripheral edge 104a of the notched opening 104 to elastically tighten the socket 100 against the bracket plate 103.

A fastening device similar to the device in FIG. 13 has been introduced by European laid-open Patent Application No. 0703395 (filed on Aug. 24, 1995 and laid open on Mar. 27, 1996). The fastening device is employed to fasten an annular member so that a columnar member is mounted on an inner wall of the annular member with an assist of a guide member coupled with a movable member and an elastic member.

In the fastening device of FIG. 13, the washer 105 is always subjected to a significant amount of reactional force from the flange portion 101 and the outer peripheral edge 104a of the notched opening 104 because the washer 105 is placed therebetween. When subjected to creep phenomenon in high temperature or stress relaxation due to an extended period of service time, it is predictable that the washer 105 reduces its urging force (elastic force) against the flange portion 101 and the outer peripheral edge 104a of the notched opening 104. Once the washer 105 loses the urging force even partly, the socket 100 likely rattles to induce a constant vibration so that the socket 100 may fall off from the bracket plate 103 without maintaining a normal cable route.

The same problem resides in the fastening device disclosed by the European laid-open Patent Application No. 0703395.

Therefore, the present invention has made with the above drawbacks in mind, it is a main object of the invention to provide a cable end fastening device which is capable of quickly fastening a socket member to a bracket with an easy operation, and maintaining a solidly fastened condition for an extended period of time without falling off from the bracket even when subjected to the creep phenomenon and relaxation influence.

SUMMARY OF THE INVENTION

According to the present invention, there is provided a cable end fastening device in which an urging member urges a nut member to always tighten the nut member on a male thread portion when fastening a socket member to a bracket. This induces a nut tightening torque to eliminate a Taxation to which the nut member is subjected, and thereby maintaining a solidly fastened condition for an extended period of time without falling off from the bracket even when subjected to the creep phenomenon and the stress relaxation influence.

According to another aspect of the present invention, a torsion coil spring is used as the urging member, one end of which removably engages with a notch portion provided with the nut member.

This makes it possible to quickly fasten the socket member to the bracket substantially with a single touch operation in which the torsion coil spring is temporarily deformed manually without using specified tools.

In particular, a raised portion is provided with the socket member, and the raised portion and one end of the urging member (torsion coil spring) are temporarily pinched before the nut member is fully tightened against the bracket. Upon fastening the socket member to the bracket, all the procedures needed is only pinching and then releasing the raised portion and the urging member, and thereby ensuring a quicker workability with an easier operation.

In addition, with the prongs engaged against the recesses when fastening the socket member to the bracket, it is possible to prevent the socket member from falling off from the bracket even when subjected to the constant vibration.

With a middle portion of the urging member temporarily engaged against a risen section of the socket member, the middle portion is disengaged from the risen section when the middle portion encounters a specified area of the bracket to release the urging force toward the nut member upon fastening the socket member to the bracket.

In this instance, the socket member is fastened to the bracket with a single touch operation in which the socket member is brought into a notched opening of the bracket. This achieves a still more efficient workability with an easier operation upon fastening the socket member to the bracket.

Such is the structure that the middle portion of the urging member is disengaged from the risen section when the middle portion encounters the specified area of the bracket at the time of fastening the socket member to the bracket. This accompanies a reactional force and a release noise which induce a detention-and-break-away feeling so that an end of the fastening procedures is readily recognized.

BRIEF DESCRIPTION OF THE DRAWINGS

Preferred forms of the present invention are illustrated in the accompanying drawings in which:

FIG. 13 is an enlarged exploded perspective view of a cable end fastening structure of a prior art counterpart.

DETAILED DESCRIPTION OF THE PREFERRED EMBODIMENTS

Figure 1:
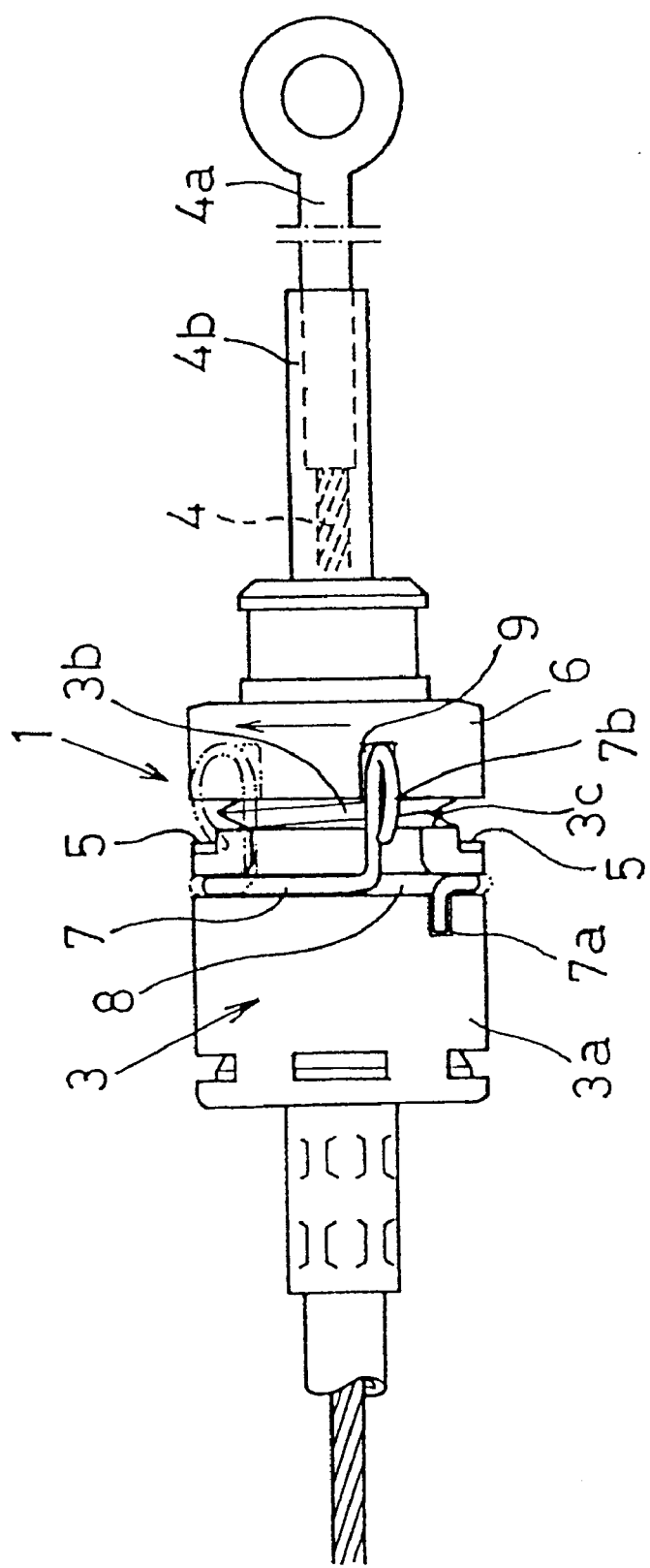
FIG. 1 is a plan view of a socket member shown together with a nut member in order to explain how a torsion coil spring works according to a first embodiment of the invention.
Figure 2:
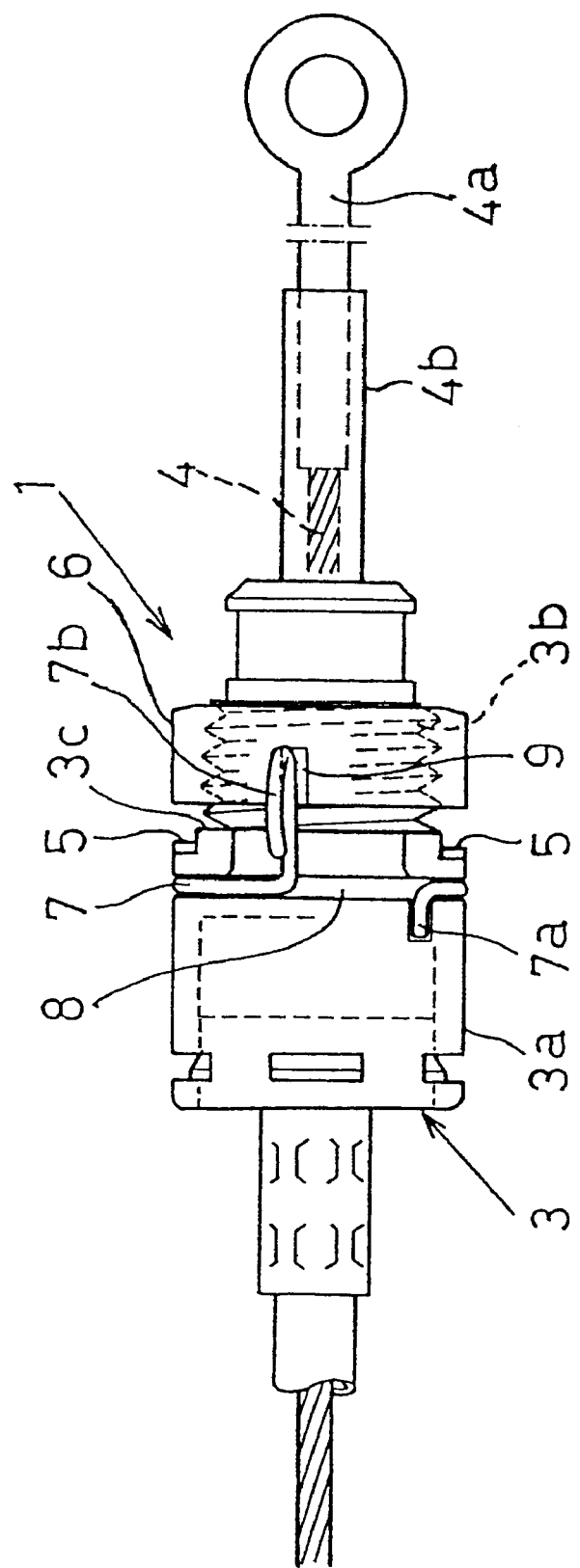
FIG. 2 is a plan view of the socket member shown together with the nut member when fastening the socket member to a bracket.

Referring to FIGS. 1, 2, 3, 3a and 3b which show a cable end fastening device 1 which is used to fastening a remote control cable for a vehicular transmission by way of illustration. The cable end fastening device 1 is fastened to a bracket (stationary member) 2 as described in detail hereinafter. The cable end fastening device 1 has a tubular socket 3 which has a diameter-increased head portion 3a and a diameter-reduced male thread portion 3b. The vehicular transmission has an inner cable 4 which passes through the socket 3 by way of a sleeve 4b. A distal end of the inner cable 4 emerges outside from the sleeve 4b, and connected to an eyerod 4a.

Figure 3:
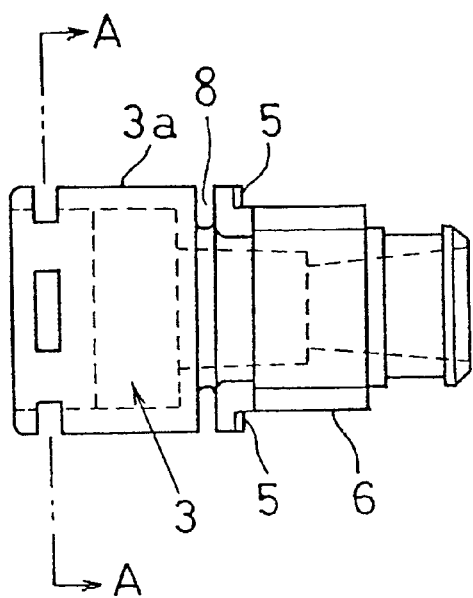
FIG. 3 is a plan view of the socket member.
Figure 3A:
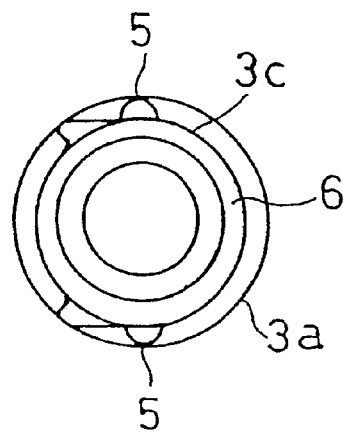
FIG. 3a is a right side elevational view of the socket member.
Figure 3B:
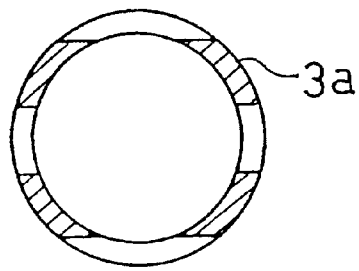
FIG. 3b is a latitudinal cross sectional view of the socket member taken along the line A—A of FIG. 3.

With a stepped interface section 3c between the head portion 3a and the male thread portion 3b, are a pair of diametrically opposed prongs 5 provided as shown in FIG. 3a. A nut 6 is mounted on the male thread portion 3b of the socket 3 in the axial direction to be tightened and loosened therealong.

Figure 4:
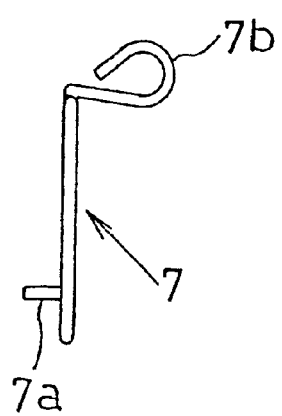
FIG. 4 is a side elevational view of the torsion coil spring.
Figure 4A:
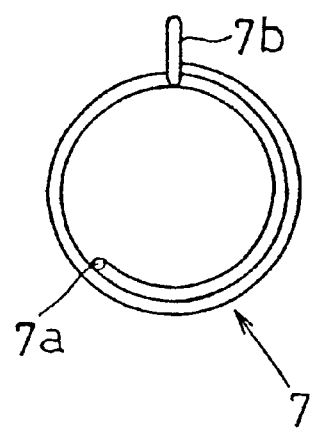
FIG. 4a is a plan view of the torsion coil spring.

A torsion coil spring 7 which is shown in FIGS. 4 and 4a, serves as an urging member. The torsion coil spring 7 has one end 7a secured to the head portion 3a of the socket 3, and having an intermediate portion encircling along a circumferential groove 8. The other end of the torsion coil spring 7 acts as a hook portion 7b which is removably engaged with a notch portion 9. The notch portion 9 is provided with an outer side of the nut 6. When the hook portion 7b is brought into engagement with the notch portion 9, the nut 6 is adapted to turn urgingly through the male thread portion 3b in such a direction as to tighten the nut 6 against the bracket 2.

Figure 5:
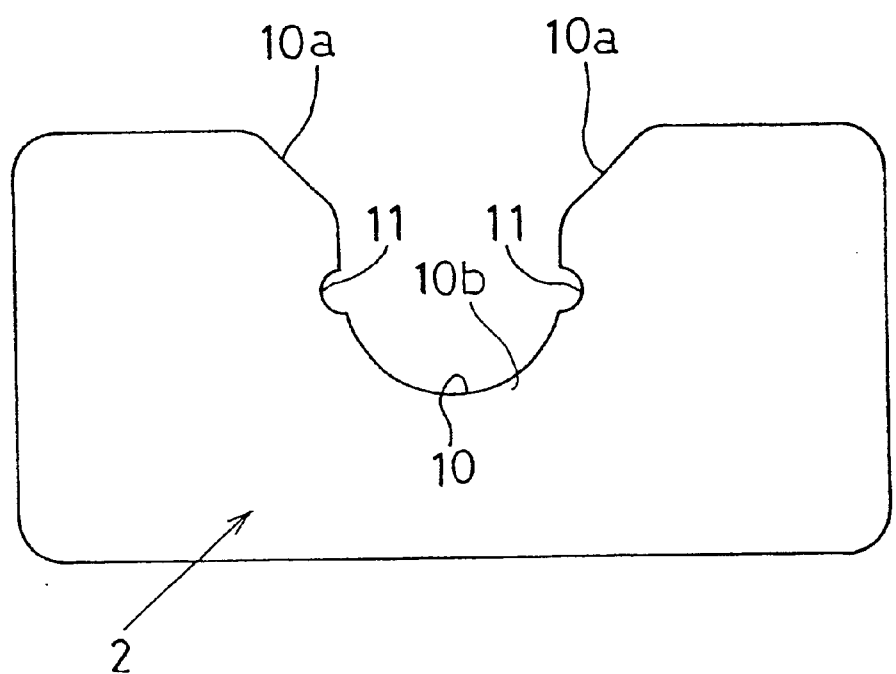
FIG. 5 is a plan view of a bracket.

As depicted in FIG. 5, the bracket 2 which is made of a sheet metal is firmly placed in a predetermined position within a vehicle. On the bracket 2, a U-shaped opening 10 is substantially provided which corresponds to the head portion 3a of the socket 3 to serve as a notched opening. The notched opening 10 releases its upper end to form a tapered entrance edge 10a which is progressively expanded in breadth as approaching upward.

On the right and left sides of the notched opening 10, a pair of recesses 11 is formed in a horizontal direction to correspond to the prongs 5 which are provided with the head portion 3a of the socket 3.

Figure 6:
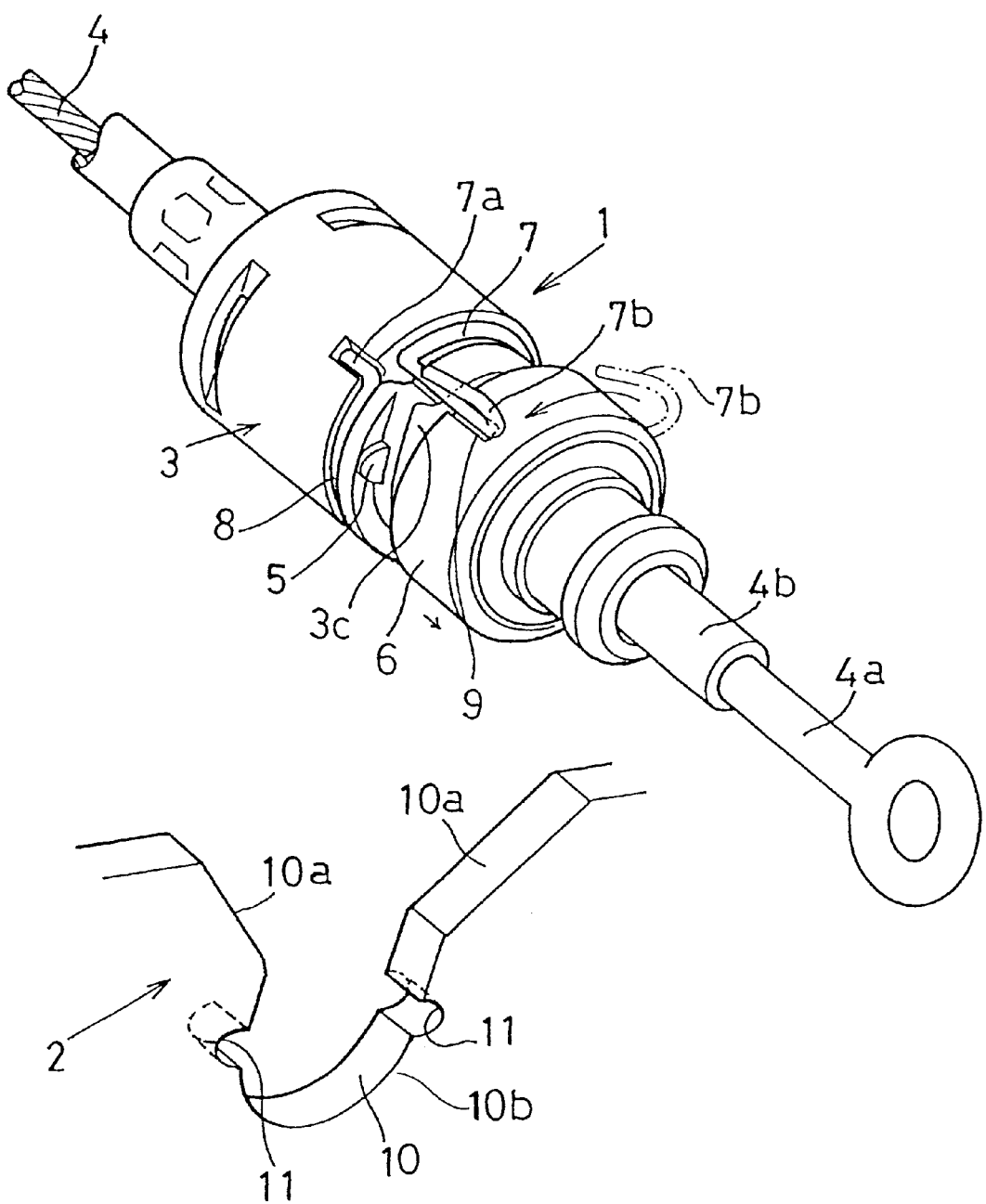
FIG. 6 is an enlarged perspective view of the socket member and the bracket to show how the socket member is fastened to the bracket.
Figure 7:
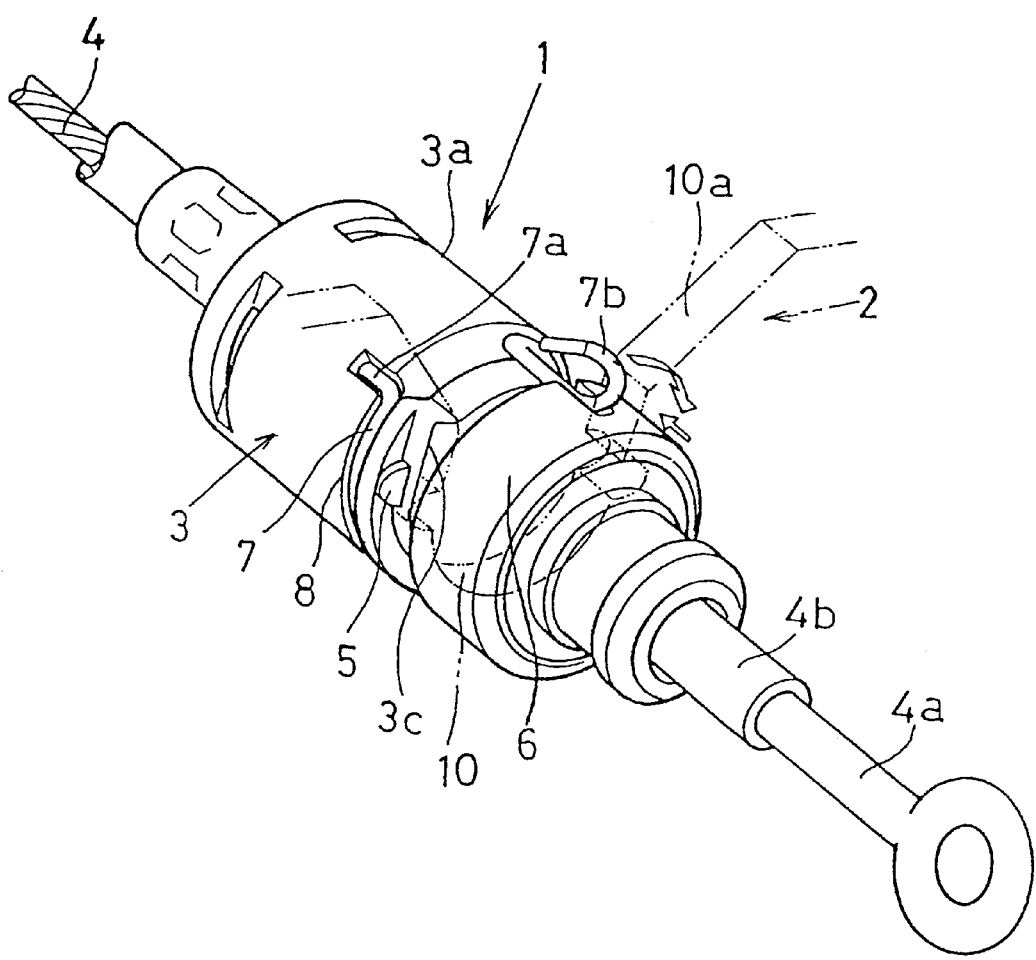
FIG. 7 is an enlarged perspective view of the socket member when the socket member is fastened to the bracket.

Upon fastening the socket 3 to the bracket 2, the nut 6 is provisionally mounted on the male thread portion 3b of the socket 3 as shown in FIG. 6. Then, the socket 3 is brought into a semi-circular area of the notched opening 10 by way of the entrance edge 10a as shown in FIG. 7.

In this instance, considering a thickness of the bracket 2, it is designed to ensure an allowance of about 1.0 mm until the nut 6 is fully tightened on the male thread portion 3b against the bracket 2. The socket 3 is positioned so that the prongs 5 are fit into the recesses 11 of the notched opening 10 so as to secure the socket 3 against removal.

The nut 6 is tightened against an outer peripheral edge 10b of the notched opening 10. Thereafter, the torsion coil spring 7 is flexed through the hook portion 7b to engage the hook portion 7b with the notch portion 9 in such a direction as to accumulate the urging force of the torsion coil spring 7. Then, the hook portion 7b is released so that the torsion coil spring 7 urgingly turns the nut 6 to tighten against the bracket 2, and remains to always urge the nut 6 to tighten. This induces a nut tightening torque to eliminate a laxation to which the nut 6 is subjected in use, and thereby maintaining a solidly fastened condition for an extended period of time without falling off from the bracket 2 even when subjected to the creep phenomenon and the stress relaxation influence.

Figure 8:
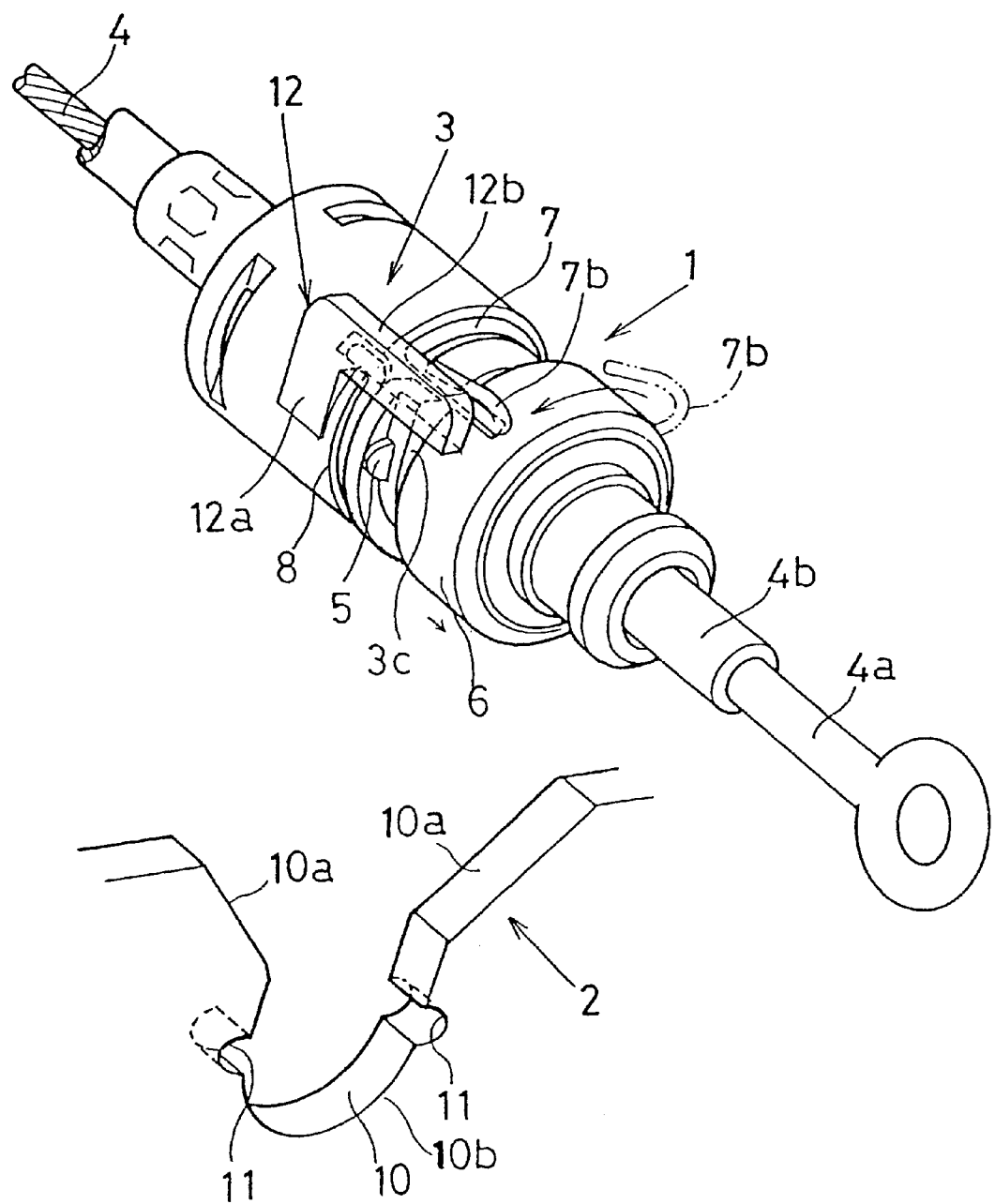
FIG. 8 is an enlarged perspective view of the socket member and the bracket to show procedures when fastening the socket member to the bracket according to a second embodiment of the invention.

FIG. 8 shows a second embodiment of the invention in which a raised portion 12 is provided with the socket 3.

The raised portion 12 is shaped into an angular configuration in which a vertical arm 12a and a horizontal arm 12b are provided. The vertical arm 12a extends from an outer surface of the socket 3, and the horizontal arm 12b extends from the vertical arm 12a to overlie the nut 6 so as to meet the hook portion 7b. In this instance, the raised portion 12 is not confined to a discrete member, and may be formed in integral with the socket 3.

Upon fastening the socket 3 to the bracket 2, the hook portion 7b and the horizontal arm 12b are pinched with the hook portion 7b placed at the notch portion 9. This loosens the nut 6 by about 1.0 mm before the nut 6 is fully tightened on the male thread portion 3b against the bracket 2 (compare a solid line position and a phantom line position in FIG. 8).

Then, the socket 3 is brought into the notched opening 10 through the entrance edge 10a.

The hook portion 7b and the horizontal arm 12b are released so that the torsion coil spring 7 urgingly turn the nut 6 to tighten in the same manner as described in the first embodiment of the invention.

FIGS. 9~12 show a third embodiment of the invention. In this instance, the same reference numerals are used to the corresponding component parts in FIGS. 1~7.

Figure 9:
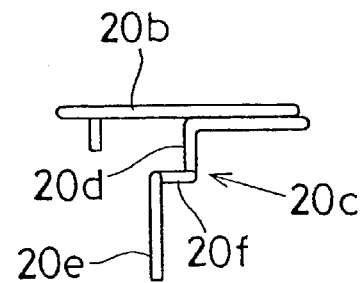
FIG. 9 is a plan view of the torsion coil spring according to a third embodiment of the invention.
Figure 9A:
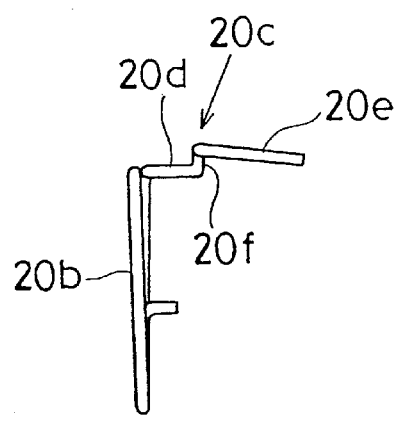
FIG. 9a is a side elevational view of the torsion coil spring.
Figure 9B:
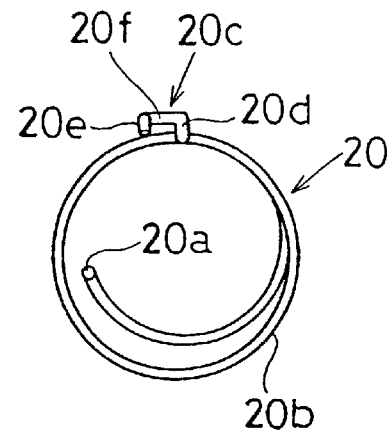
FIG. 9b is another side elevational view of the torsion coil spring.

A torsion coil spring (clip) 20 is provided as shown in FIGS. 9, 9a and 9b. The torsion coil spring 20 has one end 20a connected to a central portion of the socket 3, and a spiral portion 20b located in the circumfential groove 8 and further having a stepwise portion 20c placed across the stepped interface section 3c. The stepwise portion 20c has a basal step portion 20d and an upper portion 20e which act in turn as a middle portion and the other end of the torsion coil spring 20. The basal step portion 20d is consecutively connected to the upper portion 20e by way of a rung portion 20f.

Figure 10:
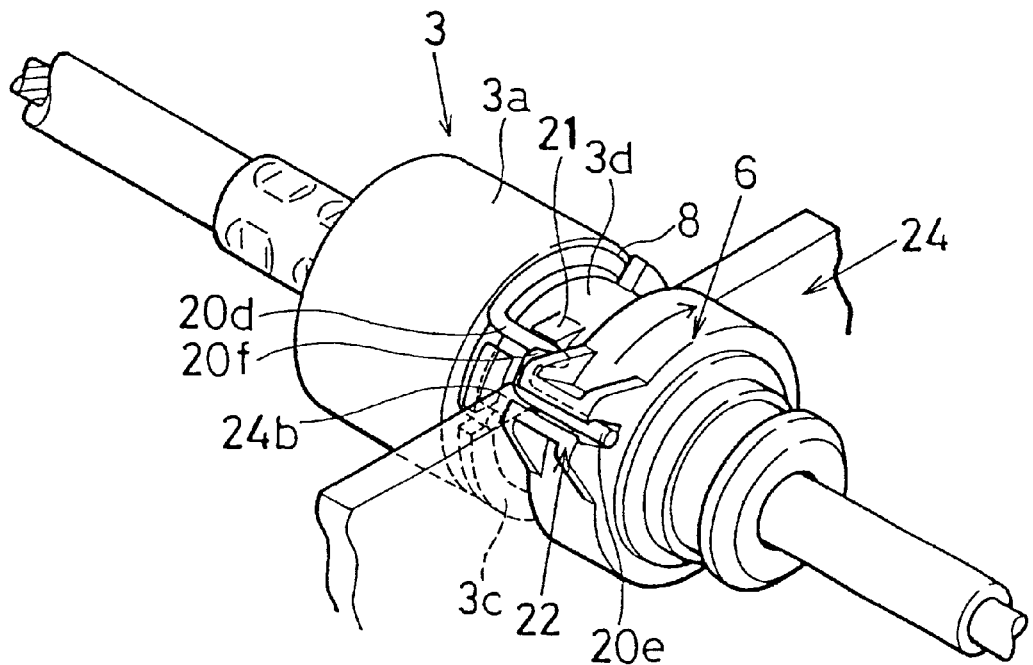
FIG. 10 is a perspective view of the socket member when starting to fasten the socket member to the bracket.
Figure 11:
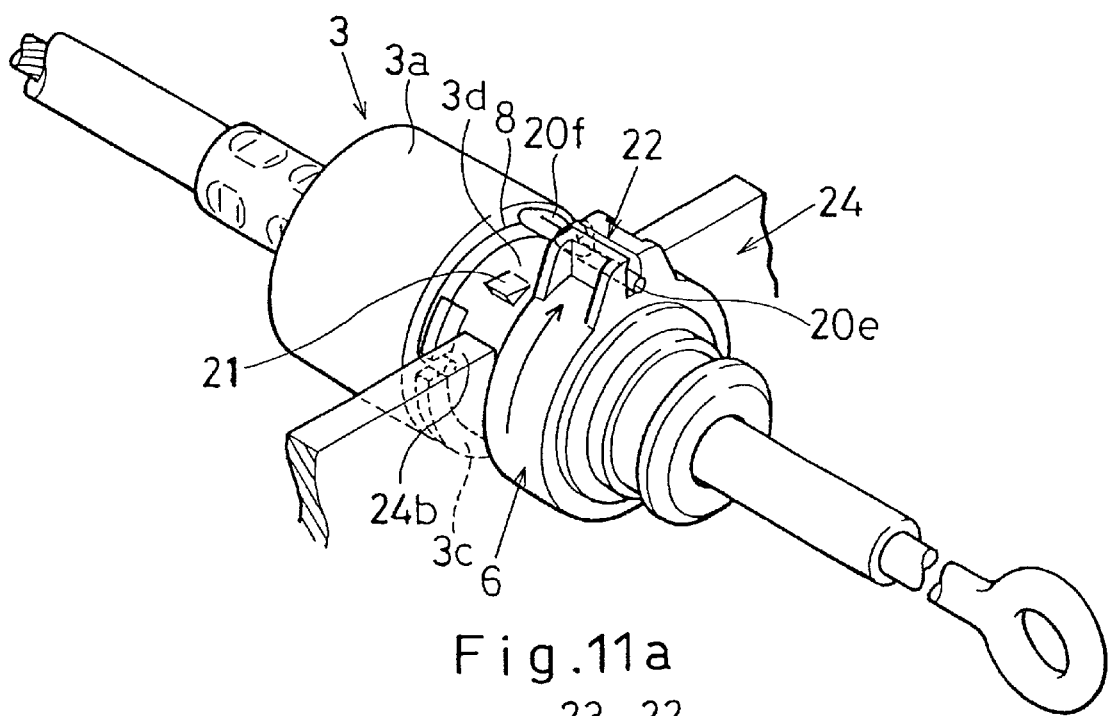
FIG. 11 is a perspective view of the socket member when the socket member is fastened to the bracket.

The basal step portion 20d is provisionally engaged with a risen section 21 which is formed on an outer surface 3d of the stepped interface section 3c so as to accumulate an urging force in the spiral portion 20b of the torsion coil spring 20 as shown in FIGS. 10 and 11.

On an outer side of the nut 6 mounted on the male thread portion 3b, a labial ridge 22 is formed. A recess provided between an upper and lower lip portion 22a, 22b of the labial ridge 22 acts as a notch portion 23. The notch portion 23 removably receives the upper portion 20e of the torsion coil spring 20.

In this instance, the nut 6 is loosened by about ¼ turns (around 1.0 mm in terms of axial clearance) before the nut 6 is fully tightened on the male thread portion 3b against a bracket 24.

Figure 12:
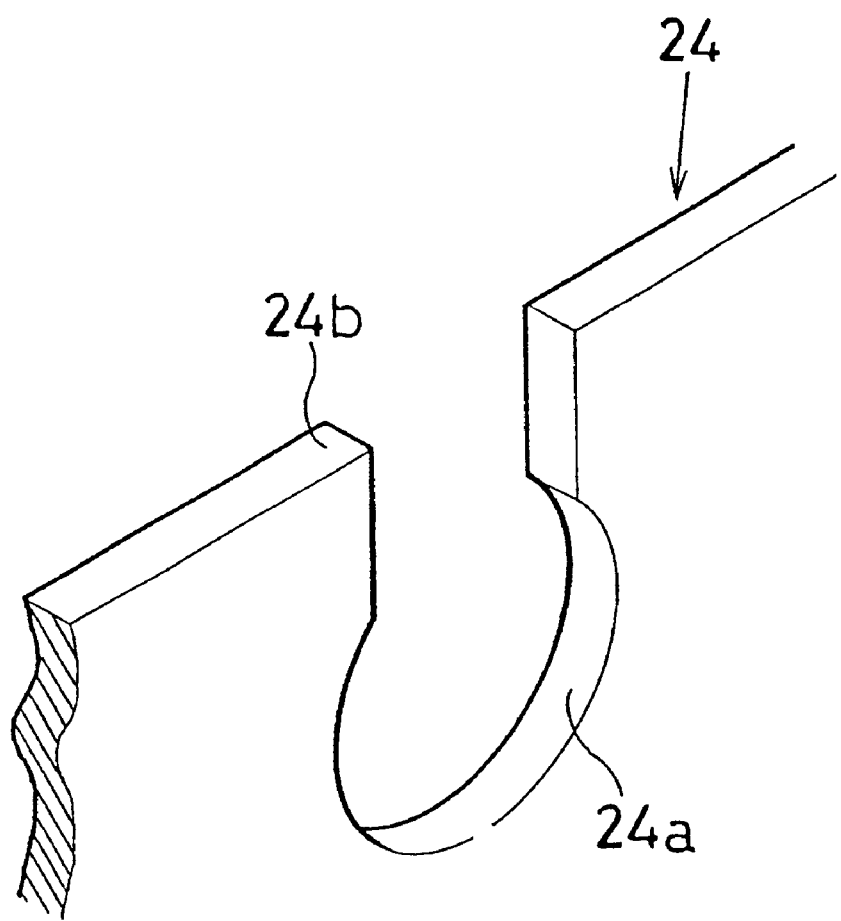
FIG. 12 is a perspective view of the bracket.

The bracket 24 has a notched opening 24a which is shaped into an inverted keyhole-like configuration as shown in FIG. 12. Upon fastening the socket 3 to the bracket 24, the socket 3 is brought into the notched opening 24a of the bracket 24 as shown in FIG. 10. Then, the rung portion 20f encounters an upper open edge (specified area) 24b to temporarily move the basal step portion 20d upward to disengage it from the risen section 21.

This temporarily accompanies an upward movement with the upper portion 20e of the torsion coil spring 20, however, the upper portion 20e remains within the notch portion 23 because the notch portion 23 is deep enough.

Figure 10A:
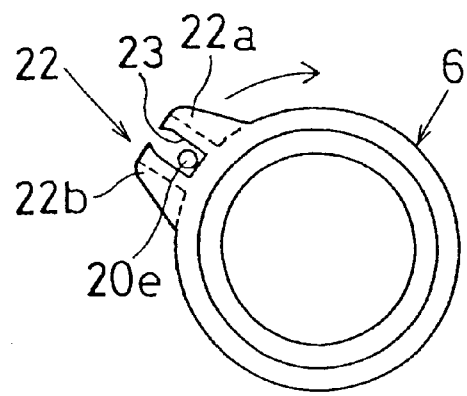
FIG. 10a is a plan view of the nut member when starting to fasten the socket member to the bracket.
Figure 11A:
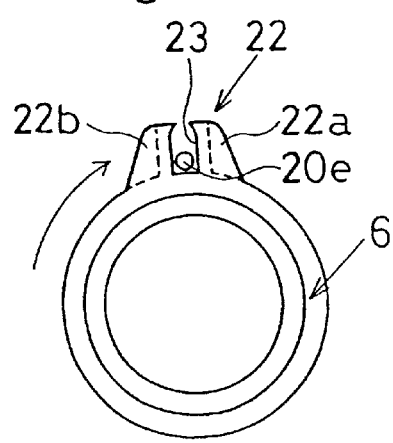
FIG. 11a is a plan view of the nut member when the socket member is fastened to the bracket.

In accompany with the basal step portion 20d disengaged from the risen section 21, the urging force accumulated in the spiral portion 20b of the torsion coil spring 20 is released to urgingly turn the nut 6 clockwisely via the upper portion 20e from the position of FIGS. 10 and 10a to the position of FIGS. 11 and 11a. The urging force induces a tendency to always urge the nut 6 to tighten against the bracket 24.

Upon unfastening the socket 3 from the bracket 24, it is done by reversing the above procedures.

The following advantages are obtained in addition to those attained by the first embodiment of the invention. (i) With the basal step portion 20d of the torsion coil spring 20 temporarily engaged with the risen section 21 of the socket 3, the basal step portion 20d is disengaged from the risen section 21 when the basal step portion 20d encounters the upper open edge 24b of the bracket 24 to release the urging force toward the nut 6 upon fastening the socket 3 to the bracket 24.

In this instance, the socket 3 is fastened to the bracket 24 with a single touch operation in which the socket 3 is brought into the notched opening 24a of the bracket 24. This achieves a still more efficient workability with an easier operation upon fastening the socket 3 to the bracket 24.

Such is the structure that the basal step portion 20d of the torsion coil spring 20 is disengaged from the risen section 21 when the basal step portion 20d the upper open edge 24b of the bracket 24 at the time of fastening the socket 3 to the bracket 24. This accompanies a reactional force and a release noise which induce a detention-and-break-away feeling so that an end of the fastening procedures is readily recognized.

Modification Forms (a) It is to be noted that the prongs 5 and recesses 11 may be formed into ellipse, triangle, rhomb, gourd-shape or polygon. The shape of the bracket 10 (24) may be altered as desired when reduced to practice.

(b) It is to be noted that the recesses 11 may be formed on the socket 3, and the prongs 5 are formed on the outer peripheral edge 10b of the notched opening 10.

(c) It is also to be noted that the turns of the spiral portion 20b of the torsion coil spring 20 may altered to adjust the urging force accumulated in the torsion coil spring 20.

(d) It is further to be observed that the upper portion 20e of the torsion coil spring 20 may be fixedly secured to the nut 6 instead of removably mounting on the notch portion 23. The nut 6 may be shaped into a hexagonal configuration in place of the circular configuration.

(e) It is furthermore to be appreciated that the male thread portion of the socket may be formed by a plurality of balls and a spiral groove in which the balls roll along the spiral groove.

(f) It is still further to be appreciated that the invention may be applied to remote control cables in general to operate windows and lids for open and close operation in lieu of the remote control cable for the vehicular transmission.

While there has been described what is at present thought to be preferred embodiments of the invention, it will be understood that modifications may be made therein and it is intended to cover in the appended claims all such modifications which fall within the scope of the invention.

This application claims benefit of Japanese patent applications No. 365163/98, filed Dec. 22 1998, and No. 357460, filed Dec. 16, 1999, which are hereby incorporated by reference.

What is claimed is:

1. A cable end fastening device comprising:
   a tubular socket member (3) having a male thread portion (3b) through which an inner cable (4) passes;
   a bracket (2) having a notched opening (10) through which said socket member (3) is provided;
   a nut member (6) mounted on said male thread portion (3b) to be tightly against an outer peripheral area (10b) of said notched opening (10) of said bracket (2);
   an urging member provided to urge said nut member (6) in such a direction as to always tighten said nut member (6); and
   said socket member (3) having a raised portion (12) to temporarily loosen said nut member (6) by pinching said raised portion (12) and one end of said urging member before fully tightening said nut member (6) against an outer peripheral area (10b) of said notched opening (10).

2. A cable end fastening device comprising:
   a tubular socket member (3) having a male thread portion (3b) through which an inner cable (4) passes;
   a bracket (2) having a notched opening (10) through which said socket member (3) is provided;
   a nut member (6) mounted on said male thread portion (3b) to be tightly against an outer peripheral area (10b) of said notched opening (10) of said bracket (2);
   a torsion coil spring (7) having one end secured to said socket member (3), and the other end detachably mounted on a notch portion (9) which is provided with an outer side of said nut member (6), and urging said nut member (6) in such a direction as to always tighten said nut member (6); and
   said socket member (3) having a raised portion (12) to temporarily loosen said nut member (6) by pinching said raised portion (12) and one end of said torsion coil spring (7) before fully tightening said nut member (6) against an outer peripheral area (10b) of said notched opening (10).

3. A cable end fastening device comprising:
   a tubular socket member (3) having a male thread portion (3b) through which an inner cable (4) passes;
   a bracket (2) having a notched opening (10) through which said socket member (3) is provided;

a nut member (6) mounted on said male thread portion (3b) to be tightly against an outer peripheral area (10b) of said notched opening (10) of said bracket (2);

an urging member provided to urge said nut member (6) in such a direction as to always tighten said nut member (6); and said socket member (3) having a risen section (21) to engage a middle portion of said urging member with the other end of said urging member located within a notch portion (23) which is provided with said nut member (6), said middle portion of said urging member encountering an upper open edge (24b) of a notched opening (24a) of a bracket (24) to disengage from said risen section (21) to tighten said nut member (6) by an urging force of said urging member when fastening to said bracket (24).

4. A cable end fastening device comprising:

a tubular socket member (3) having a male thread portion (3b) through which an inner cable (4) passes;

a bracket (2) having a notched opening (10) through which said socket member (3) is provided;

a nut member (6) mounted on said male thread portion (3b) to be tightly against an outer peripheral area (10b) of said notched opening (10) of said bracket (2);

a torsion coil spring (20) having one end secured to said socket member (3), and the other end detachably mounted on a notch portion (9) which is provided with an outer side of said nut member (6), and urging said nut member (6) in such a direction as to always tighten said nut member (6); and said socket member (3) having a risen section (21) to engage a middle portion of said torsion coil spring (20) with the other end of said torsion coil spring (20) located within a notch portion (23) which is provided with said nut member (6), said middle portion of said torsion coil spring (20) encountering an upper open edge (24b) of a notched opening (24a) of a bracket (24) to disengage from said risen section (21) to tighten said nut member (6) by an urging force of said torsion coil spring (20) when fastening to said bracket (24).

5. A cable end fastening device used in a vehicular remote control cable, the fastening device comprising:

a tubular socket member (3) having a male thread portion (3b) through which an inner cable (4) passes;

a bracket (2) having a notched opening (10) through which said socket member (3) is provided;

a nut member (6) mounted on said male thread portion (3b) to be tightly against an outer peripheral area (10b) of said notched opening (10) of said bracket (2); and an urging member provided to urge said nut member (6) in such a direction as to always tighten said nut member (6).

6. In a cable end fastening device which fastens a cable to a bracket (2), the device comprising:

a tubular socket member (3) having a male thread portion (3b) through which an inner cable (4) passes;

a nut member (6) mounted on said male thread portion (3b) to be tightly against an outer peripheral area (10b) of a notched opening (10) provided with said bracket (2);

an urging member provided to urge said nut member (6) in such a direction as to always tighten said nut member (6); and said socket member (3) having a raised portion (12) to temporarily loosen said nut member (6) by pinching said raised portion (12) and one end of said urging member before fully tightening said nut member (6) against an outer peripheral area (10b) of said notched opening (10).

7. In a cable end fastening device which fastens a cable to a bracket (2), the device comprising:

a tubular socket member (3) having a male thread portion (3b) through which an inner cable (4) passes;

a nut member (6) mounted on said male thread portion (3b) to be tightly against an outer peripheral area (10b) of a notched opening (10) provided with said bracket (2);

a torsion coil spring (7) having one end secured to said socket member (3), and the other end detachably mounted on a notch portion (9) which is provided with an outer side of said nut member (6), and urging said nut member (6) in such a direction as to always tighten said nut member (6); and said socket member (3) having a raised portion (12) to temporarily loosen said nut member (6) by pinching said raised portion (12) and one end of said torsion coil spring (7) before fully tightening said nut member (6) against an outer peripheral area (10b) of said notched opening (10).

8. In a cable end fastening device which fastens a cable to a bracket (2), the device comprising:

a tubular socket member (3) having a male thread portion (3b) through which an inner cable (4) passes;

a nut member (6) mounted on said male thread portion (3b) to be tightly against an outer peripheral area (10b) of a notched opening (10) provided with said bracket (2);

an urging member provided to urge said nut member (6) in such a direction as to always tighten said nut member (6); and said socket member (3) having a risen section (21) to engage a middle portion of said urging member with the other end of said urging member located within a notch portion (23) which is provided with said nut member (6), said middle portion of said urging member encountering an upper open edge (24b) of a notched opening (24a) of a bracket (24) to disengage from said risen section (21) to tighten said nut member (6) by an urging force of said urging member when fastening to said bracket (24).

9. In a cable end fastening device which fastens a cable to a bracket (2), the device comprising:

a tubular socket member (3) having a male thread portion (3b) through which an inner cable (4) passes;

a nut member (6) mounted on said male thread portion (3b) to be tightly against an outer peripheral area (10b) of a notched opening (10) provided with said bracket (2);

a torsion coil spring (20) provided to urge said nut member (6) in such a direction as to always tighten said nut member (6); and said socket member (3) having a risen section (21) to engage a middle portion of said torsion coil spring (20) with the other end of said torsion coil spring (20) located within a notch portion (23) which is provided with said nut member (6), said middle portion of said torsion coil spring (20) encountering an upper open edge (24b) of a notched opening (24a) of a bracket (24) to disengage from said risen section (21) to tighten said nut member (6) by an urging force of said torsion coil spring (20) when fastening to said bracket (24).

* * * * *